US009749546B2

(12) United States Patent
Matsunaga

(10) Patent No.: US 9,749,546 B2
(45) Date of Patent: Aug. 29, 2017

(54) IMAGE PROCESSING APPARATUS AND IMAGE PROCESSING METHOD

(71) Applicant: Olympus Corporation, Shibuya-ku, Tokyo (JP)

(72) Inventor: Takuya Matsunaga, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/067,520

(22) Filed: Mar. 11, 2016

(65) Prior Publication Data

US 2017/0019579 A1 Jan. 19, 2017

(30) Foreign Application Priority Data

Jul. 13, 2015 (JP) ................... 2015-139927

(51) Int. Cl.
| | | |
|---|---|---|
| *H04N 5/235* | (2006.01) | |
| *G06T 5/00* | (2006.01) | |
| *G06T 5/50* | (2006.01) | |
| *H04N 9/73* | (2006.01) | |

(52) U.S. Cl.
CPC .......... *H04N 5/2355* (2013.01); *G06T 5/008* (2013.01); *G06T 5/50* (2013.01); *H04N 9/735* (2013.01); *G06T 2207/10144* (2013.01); *G06T 2207/20208* (2013.01)

(58) Field of Classification Search
CPC .. H04N 9/735; H04N 9/73; H04N 9/68–9/69; H04N 9/77; H04N 5/2355; H04N 5/235; H04N 5/2351; H04N 5/23229; H04N 5/23277; H04N 5/35536; H04N 5/35554; H04N 1/6027; H04N 1/6086; H04N 1/6077; G06T 2207/10144; G06T 2207/20208; G06T 2207/20221; G06T 2207/20212; G06T 5/007

See application file for complete search history.

(56) References Cited

U.S. PATENT DOCUMENTS

| | | | | |
|---|---|---|---|---|
| 5,760,831 A | * | 6/1998 | Tanaka | H04N 9/735 348/223.1 |
| 6,727,942 B1 | * | 4/2004 | Miyano | H04N 9/735 348/223.1 |
| 7,450,160 B2 | * | 11/2008 | Takahashi | H04N 9/735 348/223.1 |
| 8,040,411 B2 | * | 10/2011 | Nakajima | G06T 5/009 348/254 |

(Continued)

FOREIGN PATENT DOCUMENTS

| | | |
|---|---|---|
| JP | 2003-244723 | 8/2003 |
| JP | 2014-175734 | 9/2014 |

*Primary Examiner* — Michael Osinski
(74) *Attorney, Agent, or Firm* — John C. Pokotylo; Straub & Pokotylo

(57) ABSTRACT

An image processing apparatus includes: an image data selecting section that calculates a luminance equivalent value for each of regions of two or more images of different exposure amounts, compares a luminance equivalent value with a threshold value and selects an image to be used for each region; a white balance gain calculating section that calculates a white balance coefficient using an image that is selected for each region; and a basic image processing section that corrects a white balance of a combined image using the white balance coefficient calculated by the white balance gain calculating section.

14 Claims, 9 Drawing Sheets

(56) References Cited

U.S. PATENT DOCUMENTS

| | | | | |
|---|---|---|---|---|
| 8,184,177 B2* | 5/2012 | Kakuta | | H04N 1/608 |
| | | | | 348/223.1 |
| 8,368,771 B2* | 2/2013 | Kino | | G06T 3/4069 |
| | | | | 348/216.1 |
| 8,498,031 B2* | 7/2013 | Mimoune | | H04N 9/735 |
| | | | | 358/504 |
| 8,525,900 B2* | 9/2013 | Garten | | G06F 3/1454 |
| | | | | 348/229.1 |
| 8,965,120 B2* | 2/2015 | Yamanaka | | G06T 5/003 |
| | | | | 382/167 |
| 9,083,929 B2* | 7/2015 | Kitajima | | H04N 9/735 |
| 9,420,247 B2* | 8/2016 | Jung | | H04N 9/735 |
| 9,426,438 B2* | 8/2016 | Furukawa | | H04N 5/2355 |
| 9,609,221 B2* | 3/2017 | Kim | | H04N 5/23277 |
| 2001/0016064 A1* | 8/2001 | Tsuruoka | | H04N 1/407 |
| | | | | 382/167 |
| 2004/0001639 A1* | 1/2004 | Ohno | | G06T 5/007 |
| | | | | 382/254 |
| 2004/0095478 A1* | 5/2004 | Takano | | H04N 1/6027 |
| | | | | 348/223.1 |
| 2005/0099515 A1* | 5/2005 | Tsuruoka | | H04N 5/357 |
| | | | | 348/241 |
| 2007/0146538 A1* | 6/2007 | Kakinuma | | H04N 5/144 |
| | | | | 348/362 |
| 2008/0062274 A1* | 3/2008 | Hamamura | | H04N 9/735 |
| | | | | 348/223.1 |
| 2008/0112644 A1* | 5/2008 | Yokohata | | G06K 9/64 |
| | | | | 382/278 |
| 2009/0040334 A1* | 2/2009 | Ogawa | | H04N 9/735 |
| | | | | 348/223.1 |
| 2010/0026823 A1* | 2/2010 | Sawada | | G03B 7/28 |
| | | | | 348/222.1 |
| 2010/0091119 A1* | 4/2010 | Lee | | H04N 5/23248 |
| | | | | 348/208.4 |
| 2010/0150439 A1* | 6/2010 | Lee | | H04N 9/735 |
| | | | | 382/167 |
| 2010/0208098 A1* | 8/2010 | Ogawa | | H04N 5/23245 |
| | | | | 348/223.1 |
| 2011/0211732 A1* | 9/2011 | Rapaport | | G06F 3/1454 |
| | | | | 382/107 |
| 2011/0267531 A1* | 11/2011 | Imai | | H04N 5/23212 |
| | | | | 348/333.12 |
| 2011/0292242 A1* | 12/2011 | Imai | | H04N 5/23216 |
| | | | | 348/229.1 |
| 2013/0010157 A1* | 1/2013 | Kitajima | | H04N 9/735 |
| | | | | 348/223.1 |
| 2014/0064632 A1* | 3/2014 | Manabe | | G06T 5/00 |
| | | | | 382/254 |
| 2014/0168463 A1* | 6/2014 | Tamura | | H04N 9/735 |
| | | | | 348/223.1 |
| 2014/0362281 A1* | 12/2014 | Yamada | | H04N 5/23219 |
| | | | | 348/362 |
| 2015/0244917 A1* | 8/2015 | Huang | | H04N 5/2355 |
| | | | | 348/222.1 |
| 2016/0044258 A1* | 2/2016 | Kim | | H04N 5/3535 |
| | | | | 348/296 |
| 2016/0219207 A1* | 7/2016 | Tomikura | | H04N 5/2355 |
| 2016/0269707 A1* | 9/2016 | Yoshizaki | | H04N 9/735 |
| 2016/0292835 A1* | 10/2016 | Shibata | | H04N 1/3871 |

* cited by examiner

IMAGE PROCESSING APPARATUS AND IMAGE PROCESSING METHOD

CROSS REFERENCE TO RELATED APPLICATION

This application claims benefit of Japanese Application No. 2015-139927 filed in Japan on Jul. 13, 2015, the entire contents of which are incorporated herein by this reference.

BACKGROUND OF THE INVENTION

1. Field of the Invention

The present invention relates to an image processing apparatus and an image processing method which combine a plurality of images of different exposure amounts to generate combined image data.

2. Description of the Related Art

For example, in a scene in which there is a large difference between light and darkness, such as when outside scenery is viewed in sunny weather from a window, and indoor illumination is comparatively dark, if exposure is adjusted to match the outdoor scenery, in some cases the indoors will appear as a black dead area, while if the exposure is adjusted to match the indoor illumination, in some cases the outdoor scenery will undergo halation.

With respect to such kinds of scenes in which there is a large difference between light and darkness, to respond to a demand to obtain an image in which the gradations of both the indoors and the outdoor scenery are retained as much as possible, digital cameras have been proposed which adopt HDR combination technology that creates a combined image with a wider dynamic range (high dynamic range image) than a single image.

Such digital cameras photograph a plurality of images of differing exposure amounts, for example, a plurality of images including an image photographed under brighter exposure conditions than a proper exposure and an image photographed under darker exposure conditions than a proper exposure, and subjects the plurality of images of these different exposure amounts to HDR combination to generate combined image data.

White balance correction is performed with respect to the combined image data obtained in this manner, similarly to normal image data of a single photographed image. However, because a plurality of pieces of image data are the sources for generating the combined image data, proposals have been made with respect to which piece of image data to use as a basis for calculation of white balance coefficients.

For example, Japanese Patent Application Laid-Open Publication No. 2014-175734 discloses technology that, based on a predetermined condition, selects the evaluation result of which image among at least two images of different exposure amounts to use for calculating a white balance correction value.

In this connection, with respect to calculation of a white balance correction value in a single image, Japanese Patent Application Laid-Open Publication No. 2003-244723 describes technology that divides an image into a plurality of regions.

SUMMARY OF THE INVENTION

An image processing apparatus according to an aspect of the present invention is an image processing apparatus that combines a plurality of pieces of image data of different exposure amounts to generate combined image data, including: an image information calculation section configured to divide each of two or more pieces of image data among the plurality of pieces of image data into a plurality of regions, and calculate image information including a luminance equivalent value for each region into which the two or more pieces of image data are divided; an image data selecting section configured to select, for each of the regions, one or more pieces of image data to be used for white balance adjustment from among the two or more pieces of image data, in accordance with a result of comparing the luminance equivalent value and a predetermined threshold value; a white balance gain calculating section configured to calculate a white balance coefficient for applying to the combined image data, using image data that is selected for each of the regions by the image data selecting section; and a white balance correction section configured to correct a white balance of the combined image data using the white balance coefficient that is calculated by the white balance gain calculating section.

An image processing method according to an aspect of the present invention is an image processing method for combining a plurality of pieces of image data of different exposure amounts to generate combined image data, including: a first step of dividing each of two or more pieces of image data among the plurality of pieces of image data into a plurality of regions, and calculating image information including a luminance equivalent value for each region into which the two or more pieces of image data are divided; a second step of selecting, for each of the regions, one or more pieces of image data to be used for white balance adjustment from among the two or more pieces of image data, in accordance with a result of comparing the luminance equivalent value and a predetermined threshold value; a third step of calculating a white balance coefficient for applying to the combined image data, using image data that is selected for each of the regions by the second step; and a fourth step of correcting a white balance of the combined image data using the white balance coefficient that is calculated by the third step.

DETAILED DESCRIPTION OF THE PREFERRED EMBODIMENTS

Embodiments of the present invention are described below with reference to the drawings.
[First Embodiment]

Figure 1:
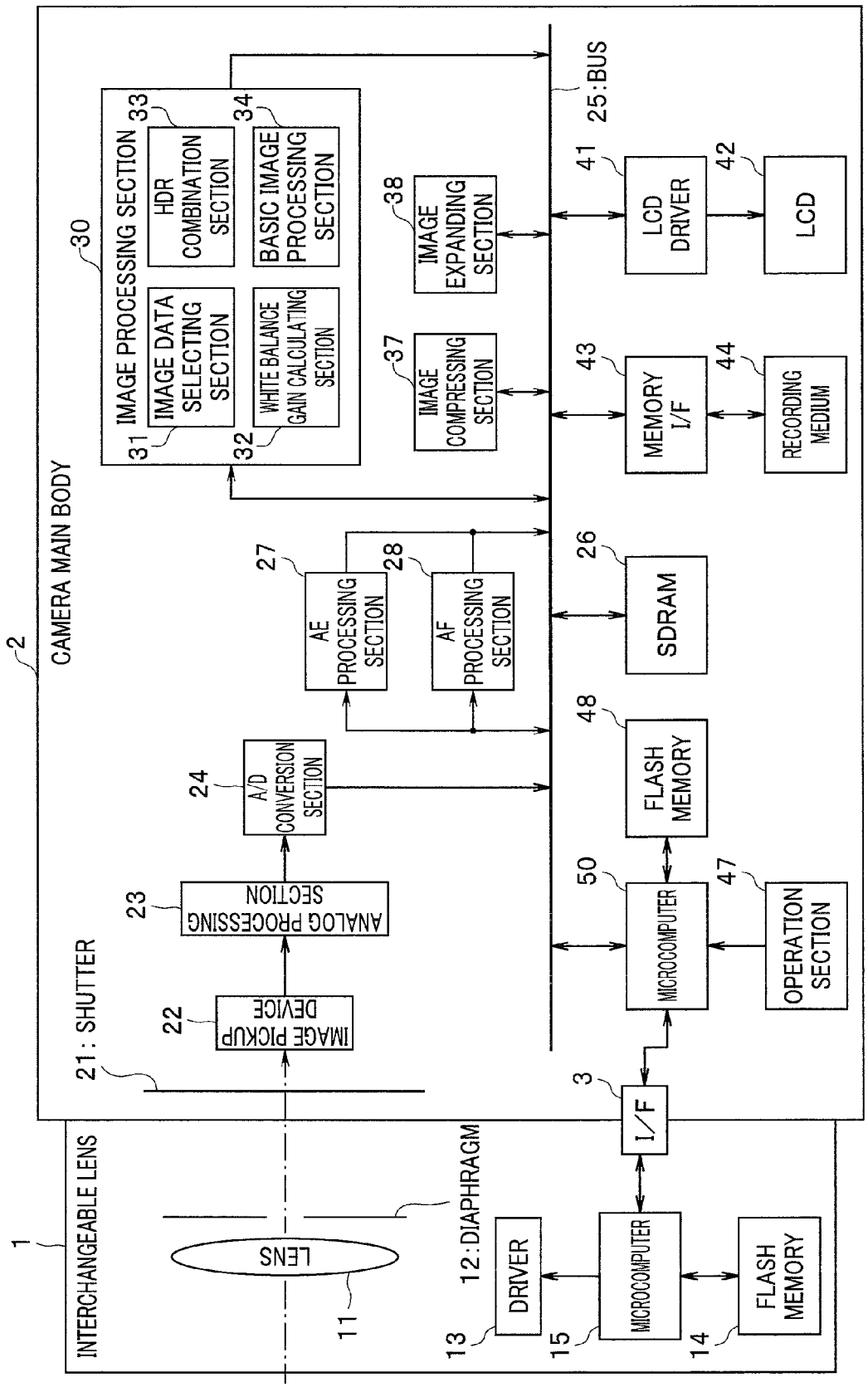
FIG. 1 is a block diagram showing a configuration of an image pickup apparatus in a first embodiment of the present invention.

FIGS. 1 to 10 are diagrams illustrating a first embodiment of the present invention. FIG. 1 is a block diagram illustrating a configuration of an image pickup apparatus. That is, in the present embodiment, an image processing apparatus that combines a plurality of pieces of image data of different exposure amounts to generate combined image data is applied to an image pickup apparatus.

Note that, although the present embodiment is described taking an interchangeable lens type digital camera as an example of an image pickup apparatus, the present invention is not limited thereto, and the present invention may be applied to an arbitrary apparatus as long as the apparatus includes an image pickup function, such as a fixed lens type compact digital camera or a smartphone.

The image pickup apparatus is constituted by connecting an interchangeable lens 1 and a camera main body 2 through an interface (I/F) 3 so as to enable communication therebetween, and has a function that combines a plurality of pieces of image data obtained by consecutive photographing to generate combined image data of a single image.

The interchangeable lens 1 is configured, for example, to be detachably attachable to the camera main body 2 via a lens mount. The interface 3 is constituted by electric contacts formed on the lens mount or the like (an electric contact provided on the interchangeable lens 1 side and an electric contact provided on the camera main body 2 side).

The interchangeable lens 1 includes a lens 11, a diaphragm 12, a driver 13, a flash memory 14 and a microcomputer 15.

The lens 11 is a photographing optical system for forming an optical image of an object on an image pickup device 22, described later, of the camera main body 2.

The diaphragm 12 is an optical diaphragm that controls a passing range of a light beam from the lens 11 to the image pickup device 22.

The driver 13 drives the lens 11 to perform adjustment of a focus position based on a command from the microcomputer 15, and in a case where the lens 11 is an electric zoom lens or the like the driver 13 also changes the focal distance. In addition, based on a command from the microcomputer 15, the driver 13 drives the diaphragm 12 to change the opening diameter. By driving the diaphragm 12, the brightness of an optical image of an object changes, and the size of blurring or the like also changes.

The flash memory 14 is a storage medium that stores a control program that is executed by the microcomputer 15 and various kinds of information relating to the interchangeable lens 1.

The microcomputer 15 is a so-called "lens-side computer", and is connected to the driver 13, the flash memory 14 and the interface 3. The microcomputer 15 communicates with a microcomputer 50 that is a main body-side computer, described later, through the interface 3, and receives commands from the microcomputer 50 to perform reading/writing of information stored on the flash memory 14 to thereby control the driver 13. In addition, the microcomputer 15 sends various kinds of information relating to the interchangeable lens 1 to the microcomputer 50.

The interface 3 connects the microcomputer 15 of the interchangeable lens 1 and the microcomputer 50 of the camera main body 2 to enable bidirectional communication therebetween.

The camera main body 2 includes a shutter 21, an image pickup device 22, an analog processing section 23, an analog/digital conversion section (A/D conversion section) 24, a bus 25, an SDRAM 26, an AE processing section 27, an AF processing section 28, an image processing section 30, an image compressing section 37, an image expanding section 38, an LCD driver 41, an LCD 42, a memory interface (memory I/F) 43, a recording medium 44, an operation section 47, a flash memory 48 and the microcomputer 50.

The shutter 21 controls a time period taken for a light beam from the lens 11 to reach the image pickup device 22, and is configured as, for example, a mechanical shutter that causes a shutter curtain to travel. The shutter 21 is driven by a command of the microcomputer 50, and controls a time period taken for a light beam to reach the image pickup device 22, that is, an exposure time period of an object by the image pickup device 22.

The image pickup device 22 is an image pickup section that has a plurality of pixels which are two-dimensionally arrayed at a predetermined pixel pitch on an image pickup surface, and that, based on control of the microcomputer 50 as an image pickup control section, receives a light beam from the lens 11 and the diaphragm 12 to pick up an image (that is, photoelectrically converts an optical image of an object for which an image was formed) and generates an analog image signal. In this case, in order that the image pickup device 22 is disposed so that a surface that is perpendicular to the optical axis of the lens 11 is a light-receiving surface, the direction of the two-dimensional shaped array of the plurality of pixels is a direction that is perpendicular to the optical axis of the lens 11.

The image pickup device 22 of the present embodiment is configured as, for example, a single-panel type image pickup device in which color filters of a primary color Bayer array (a R (red), G (green) and B (blue) Bayer array) are disposed on the front face of a plurality of pixels arrayed in the vertical direction and horizontal direction. Note that the image pickup device 22 is not naturally limited to a single-panel type image pickup device, and for example may be an image pickup device that is laminated so as to separate color components in the substrate thickness direction.

The analog processing section 23 performs waveform shaping upon reducing reset noise and the like with respect to an analog image signal that is read out from the image pickup device 22, and furthermore increases a gain so as to achieve an intended brightness.

The A/D conversion section 24 converts an analog image signal outputted from the analog processing section 23 to a digital image signal (referred to as "image data" as appropriate).

The bus 25 is a transfer path for transferring various kinds of data or control signals generated at a certain place inside the image pickup apparatus to another place inside the image pickup apparatus. The bus 25 according to the present embodiment is connected to the A/D conversion section 24, the SDRAM 26, the AE processing section 27, the AF processing section 28, the image processing section 30, the image compressing section 37, the image expanding section 38, the LCD driver 41, the memory I/F 43 and the microcomputer 50.

Image data outputted from the A/D conversion section 24 (hereinafter referred to as "RAW image data" as appropriate) is transferred via the bus 25 and temporarily stored in the SDRAM 26.

The SDRAM 26 is a storing section that temporarily stores the aforementioned RAW image data or various kinds of data such as image data that was processed at the image processing section 30, the image compressing section 37 or the image expanding section 38 or the like.

The AE processing section 27 calculates an object luminance based on RAW image data. The object luminance that is calculated by the AE processing section 27 is used for automatic exposure (AE) control, that is, control of the diaphragm 12, control of the shutter 21, or exposure timing control of the image pickup device 22 (or control of a so-called "electronic shutter") or the like.

The AF processing section 28 extracts a signal of a high-frequency component from RAW image data, and acquires a focusing detection value by AF (auto focus) integration processing. The focusing detection value acquired here is used for AF driving of the lens 11. Note that the AF is not naturally limited to this kind of contrast AF, and for example a configuration may be adopted so as to perform phase contrast AF using a dedicated AF sensor (or an AF pixel on the image pickup device 22).

The image processing section 30 performs various kinds of image processing on image data, and includes an image data selecting section 31, a white balance gain calculating section 32, a HDR combination section 33 and a basic image processing section 34.

The image data selecting section 31 functions as an image information calculation section that divides each of two or more pieces of image data among a plurality of pieces of image data of different exposure amounts into a plurality of regions, and calculates image information including a luminance equivalent value for each region into which the image data is divided. In addition, in accordance with a result of comparing a luminance equivalent value and a predetermined threshold value, for each region, the image data selecting section 31 selects one or more pieces of image data to be used for white balance adjustment from among the aforementioned two or more pieces of image data. Thus, the image data selecting section 31 is a section that, when performing HDR combination processing, selects which image data photographed under which exposure conditions is to be used for each region into which the image data is divided. Further, when the image data selecting section 31 selects image data, it is not necessary to adopt all of a plurality of pieces of image data of different exposure amounts that are used in HDR combination processing as candidates for the image data to be used in white balance adjustment, and it is sufficient to adopt two or more pieces of image data as candidates.

The white balance gain calculating section 32 calculates white balance coefficients as a white balance gain for applying to combined image data, using image data selected for each region by the image data selecting section 31.

The HDR combination section 33 is an image combining section that combines a plurality of images of different exposure amounts to generate a high dynamic range image combination (HDR image combination). Specifically, for example, the HDR combination section 33 compares luminance equivalent values at the same pixel position in a plurality of images of different exposure amounts, and adopts a pixel value of an image for which the luminance equivalent value is the most suitable, as the pixel value in the HDR combined image and the like.

The basic image processing section 34 performs various kinds of processing such as OB subtraction, white balance correction, synchronization, color matrix calculation, gamma conversion, color correction, edge enhancement and noise reduction. Accordingly, the basic image processing section 34 includes a function as a white balance correction section. Image data that is obtained after undergoing various kinds of processing by the image processing section 30 is again stored in the SDRAM 26.

Upon recording image data, the image compressing section 37 reads out image data that was processed by the image processing section 30 from the SDRAM 26 and compresses the image data according to the JPEG compression scheme to thereby generate JPEG image data. A header and the like are added to the JPEG image data by the microcomputer 50, and the JPEG image data is then recorded as a JPEG file on the recording medium 44 via the memory I/F 43.

The image expanding section 38 expands compressed image data. For example, in a case of reproducing a recorded image, based on control of the microcomputer 50, the image expanding section 38 expands JPEG image data of a JPEG file that is read out from the recording medium 44 via the memory I/F 43, in accordance with the JPEG expansion method.

The LCD driver 41 reads out image data that is stored in the SDRAM 26, converts the image data that is read into a video signal, and drivingly controls the LCD 42 to cause the LCD 42 to display an image that is based on the video signal.

The LCD 42 displays an image as a result of being drivingly controlled by the LCD driver 41 as described above, and also displays various kinds of information relating to the image pickup apparatus.

In this case, an image display that is performed on the LCD 42 includes a REC view display that displays image data immediately after photographing for a short time period only, a reproduction display of a JPEG file that is recorded on the recording medium 44, a live view display, and the like.

The memory I/F 43 is a recording control section that performs control to record image data to the recording medium 44, and also performs reading out of image data from the recording medium 44.

The recording medium 44 is a recording section that nonvolatily stores image data, and is constituted, for example, by a memory card that can be detachably inserted into the camera main body 2. However, the recording medium 44 is not limited to a memory card, and may be a disk-shaped recording medium or another arbitrary recording medium. Accordingly, it is not necessary for the recording medium 44 to be an inherent component of the image pickup apparatus.

The operation section 47 is a section for performing various kinds of input operations with respect to the image pickup apparatus. The image pickup apparatus includes: a power button for turning the power on and off; a release button for instructing the start of photographing of an image, which, for example, is formed of a two-stage operation button configured to have a 1st (first) release switch and a 2nd (second) release switch; a reproduction button for performing reproduction of a recorded image; a menu button for performing settings for the image pickup apparatus and the like; and operation buttons such as cross keys that are used for an operation to select an item and an OK button that is used for an operation to confirm a selected item. In this case, items that can be set using the menu button, cross keys and OK button include a photographing mode (program photographing mode, diaphragm priority photographing mode, shutter speed priority photographing mode, manual photographing mode, HDR combination mode, underwater photographing mode and HDR combination underwater photographing mode and the like), a recording mode (JPEG recording mode, RAW+JPEG recording mode and the like), and a reproduction mode. When an operation is performed with respect to the operation section 47, a signal in accordance with the operation contents is outputted to the microcomputer 50.

The flash memory 48 is a storage medium that nonvolatily stores processing programs that are executed by the microcomputer 50, and various kinds of information relating to the image pickup apparatus. In this case, several examples may be mentioned as the information that the flash memory 48 stores, such as parameters that are used for image processing, a model name and serial number for identifying the camera main body 2, and setting values that are set by a user. The information that the flash memory 48 stores is read by the microcomputer 50.

The microcomputer 50 controls each section within the camera main body 2 and also sends commands to the microcomputer 15 through the interface 3 to control the interchangeable lens 1, and is a control section that performs overall control of the image pickup apparatus. When a user performs an input operation at the operation section 47, in accordance with a processing program that is stored on the flash memory 48, the microcomputer 50 reads in parameters required for processing from the flash memory 48 and executes various sequences according to the operation contents.

The microcomputer 50 as a control section is configured to function as an image pickup control section that, in the HDR combination mode (or the HDR combination underwater photographing mode; the same applies hereinafter as appropriate), causes the image pickup device 22 to perform an image pickup operation while controlling the diaphragm 12, the shutter 21, the gain (ISO sensitivity) of the analog processing section 23, and the like to cause the image pickup device 22 to acquire a plurality of pieces of image data of different exposure amounts.

Figure 2:
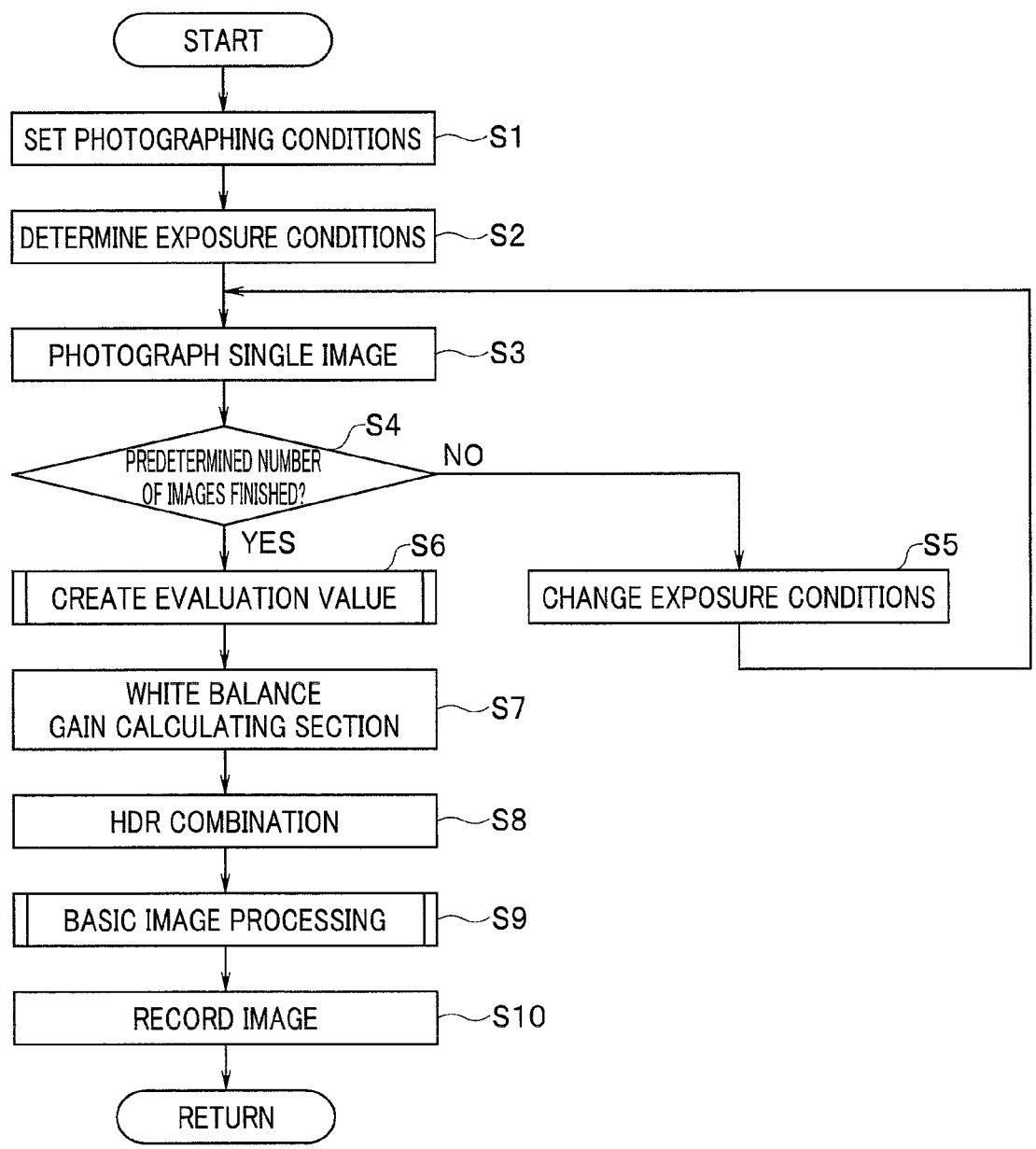
FIG. 2 is a flowchart illustrating processing in a photographing mode in the image pickup apparatus of the first embodiment.

FIG. 2 is a flowchart illustrating processing in a photographing mode of the image pickup apparatus. This processing (and processing illustrated in each flowchart described hereinafter) is performed based on control of the microcomputer 50 as the control section.

When the power of the image pickup apparatus is turned on by means of the power button and processing of a main routine that is not illustrated in the drawings is being performed, this processing is executed if the image pickup apparatus is set to the photographing mode by operation of the operation section 47.

Thereupon, first, photographing conditions are set (step S1). In this case, various photographing conditions that were set by the user are acquired, and setting is performed so as to set the acquired photographing conditions. Specifically, the microcomputer 50 determines whether the user set any of the program photographing mode, the diaphragm priority photographing mode, the shutter speed priority photographing mode, the manual photographing mode, the HDR combination mode, the underwater photographing mode and the HDR combination underwater photographing mode or the like as the photographing mode, and the microcomputer 50 sets the mode of the image pickup apparatus in accordance with the determined result.

Note that, in the following description, it is assumed that the HDR combination mode or the HDR combination underwater photographing mode is set.

Next, for example, based on an image acquired in the live view, a photometric operation is performed by the AE processing section 27 and a range-finding operation is performed by the AF processing section 28 to determine the exposure conditions (step S2).

That is, the microcomputer 50 drives a focus lens of the lens 11 based on the range-finding operation result to adjust the focus lens so that an object image is brought into focus on the image pickup device 22, and calculates and sets an exposure amount based on the photometric operation result. However, in a case where the user manually sets the focus position or exposure amount, the manual setting value is used with priority over the automatic setting value.

In this case, because it is assumed that the HDR combination mode or the HDR combination underwater photographing mode is set, exposure conditions for obtaining a proper exposure image based on a photometric operation result, exposure conditions for obtaining an underexposure image that is darker than a proper exposure image, and exposure conditions for obtaining an overexposure image that is brighter than a proper exposure image are calculated and, for example, first, the diaphragm value, shutter speed and ISO sensitivity or the like are set so as to realize the exposure conditions for obtaining a proper exposure image (however, since the photographing order is not particularly limited, in a case of photographing an underexposure image or an overexposure image prior to a proper exposure image, the exposure conditions for obtaining these images are set first). In this case, with respect to the respective exposure correction amounts of the underexposure image and overexposure image relative to the proper exposure image, if there are values that the user has set, those values are used, while if there are no values that were set by the user, it is sufficient to use predetermined values.

A single image is then photographed according to the exposure conditions that are set (step S3).

Next, the microcomputer 50 determines whether or not photographing of a predetermined number of images in the HDR combination mode (or HDR combination underwater photographing mode) is finished (step S4). With respect to the number of images to be photographed also, if the user has set the number of images to be photographed, that number is used, while if the user has not set the number of images to be photographed, it is sufficient to use a predetermined number of images. Note that, in the present embodiment, basically a case is described in which the predetermined number of images is three (or, as described later referring to FIG. 7, a case is also described in which, in HDR combination processing of a moving image, a through image or the like, the number of photographed images is two (a case where a proper exposure image is not photographed, and only an underexposure image or an overexposure image are photographed or the like).

In the present step S4, if it is determined that photographing of a predetermined number of images is not finished, the exposure conditions are changed to exposure conditions for the next image (step S5), and thereafter the operation returns to step S3 to perform the next photographing.

When it is determined in step S4 that photographing of a predetermined number of images has finished in this manner, the image data selecting section 31 creates an evaluation value (step S6). Note that, as the images used for creation of the evaluation value, all of the photographed images may be used or some of the images may be used. For example, from among a plurality of images that are photographed, a proper exposure image, an image that is photographed with the most overexposed conditions, and an image that is photographed with the most underexposed conditions may be used.

Figure 3:
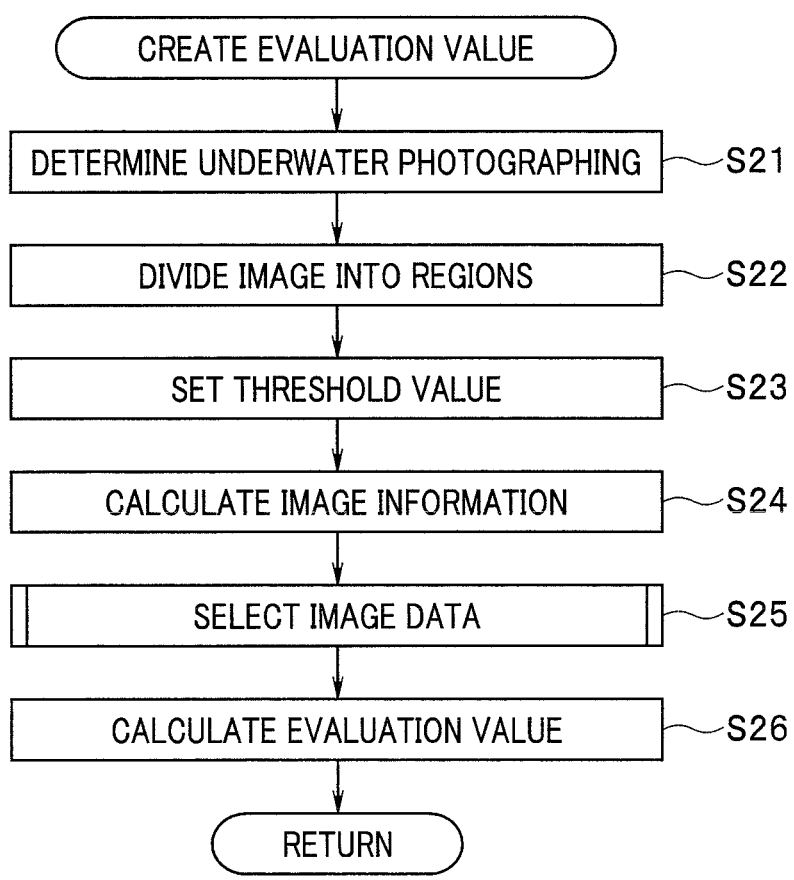
FIG. 3 is a flowchart illustrating details of evaluation value creation processing in step S6 of FIG. 2 of the first embodiment.

FIG. 3 is a flowchart illustrating the details of evaluation value creation processing in step S6 in FIG. 2 in this case.

When the processing in the flowchart in FIG. 3 starts, first the microcomputer 50 functions as an underwater photographing determination section to determine whether or not underwater photographing is being performed (step S21). This determination may be made based on a setting that is manually inputted by the user (an input operation to set the HDR combination underwater photographing mode or the like), or may be performed as an automatic determination by, for example, analyzing the proper exposure image among the photographed images. In the case of an automatic determination, for example, a method may be mentioned that determines that underwater photographing is being performed in a case where color components of the entire image are analyzed and the proportion of a blue color component is high.

Next, each of two or more pieces of image data among a plurality of images of different exposure amounts is divided into N regions that are a plurality of regions (step S22). In this case, division by 64×64 in length and width, respectively, may be mentioned as an example of the division method. This division may be performed at regular intervals (that is, by making the size of each region equal) or may be performed with different intervals at a center portion and a peripheral portion. Hereinafter, as appropriate, the divided regions are denoted by i (i=1, . . . , N) to differentiate between the regions.

In addition, the image data selecting section 31 sets a threshold value that is used when selecting an image (step S23). In this case, when the number of the two or more pieces of image data among the plurality of pieces of image data of different exposure amounts is taken as n pieces of image data, the image data selecting section 31 sets the threshold value to (n−1). As a specific example, when the number of images is three, the image data selecting section 31 sets the threshold value to two.

It is not necessary to vary the threshold value for each region i, and the same value may be used for all of the regions i. The threshold value may be a predetermined value, or may be a value that is adjusted according to the conditions at a time of photographing. An example in which the image data selecting section 31 sets the threshold value according to the conditions at a time of photographing is described later referring to FIG. 7.

Next, image information for each region i is calculated for the proper exposure image, the overexposure image and the underexposure image, respectively (step S24). The image information calculated in this case includes a luminance equivalent value. For example, in the case of a RAW image that is an RGB Bayer image, the luminance equivalent value is an average value (or may be an integrated value; the same applies hereinafter) of pixel values of G pixels within the region i, or is an average Y value that is obtained by converting an average value of pixel values for the respective color components of RGB within the region i into a Y value or the like.

Specifically, when images of different exposure amounts are represented by "e", in particular, when the number of images is three, a proper exposure image is represented by e=0, an overexposure image is represented by e=+1, and an underexposure image is represented by e=−1.

Average values of color components Re(x,y), Ge(x,y) and Be(x,y) included in a region i with respect to pixel coordinates (x,y) (that is, such that (x,y)∈i) in an image e are represented by Rei, Gei, and Bei, respectively, as shown in the following Equation 1.

$$R_{ei} = \frac{\sum_{(x,y)\in i} R_e(x, y)}{\sum_{(x,y)\in i} 1}$$

$$G_{ei} = \frac{\sum_{(x,y)\in i} G_e(x, y)}{\sum_{(x,y)\in i} 1}$$

$$B_{ei} = \frac{\sum_{(x,y)\in i} B_e(x, y)}{\sum_{(x,y)\in i} 1}$$

[Equation 1]

A regional average value Gei of a color component that includes the largest luminance component among regional average values Rei, Gei and Bei of color components that are the image information calculated in this case corresponds to the aforementioned luminance equivalent value. However, as described above, a regional average value Yei of the luminance component may be calculated by multiplying the regional average values Rei, Gei and Bei of the respective color components by a coefficient and adding the results, and the calculated regional average value Yei of the luminance component may be used as the luminance equivalent value.

Next, using the threshold value that is set in step S23 and the luminance equivalent value calculated in step S24, the microcomputer 50 sets which one or more image e to be selected for each region i as an image to be used for white balance adjustment, more specifically, the microcomputer 50 sets which image e and with which weight we is to be used for each region i (step S25).

In this case, the weight we satisfies a normalization condition as shown in the following Equation 2.

$$\sum_{e=-1}^{1} w_e = 1$$

[Equation 2]

A specific example regarding what value to set the weight we to is described later referring to FIG. 4, FIG. 5, FIG. 8, FIG. 9, and the like.

After the weight we is set in this manner, based on image information (regional average values Rei, Gei and Bei of the color components) of a certain region i in one or more images selected with respect to the region i, the image data selecting section 31 calculates weighted color components Ri, Gi and Bi of the region i using the weight we as shown by the following Equation 3 (step S26). The weighted color components Ri, Gi and Bi calculated here are evaluation values for each region i that are used when calculating white balance coefficients.

$$R_i = \sum_{e=-1}^{1} w_e \times R_{ei}$$

$$G_i = \sum_{e=-1}^{1} w_e \times G_{ei}$$

$$B_i = \sum_{e=-1}^{1} w_e \times B_{ei}$$

[Equation 3]

After the processing in step S26 is performed in the above manner, the operation returns from this processing.

Returning to the description of FIG. 2, based on evaluation values calculated by the image data selecting section 31, the white balance gain calculating section 32 calculates white balance coefficients to be applied to the combined image data (step S7).

Specifically, first, based on the evaluation values Ri, Gi and Bi for each region i, for example, the white balance gain calculating section 32 calculates evaluation values <R>, <G> and <B> for the entire image using a weight αi for each region i as shown in the following Equation 4.

$$\langle R \rangle = \frac{\sum_{i=1}^{N} \alpha_i \times R_i}{\sum_{i=1}^{N} \alpha_i}$$

$$\langle G \rangle = \frac{\sum_{i=1}^{N} \alpha_i \times G_i}{\sum_{i=1}^{N} \alpha_i}$$

$$\langle B \rangle = \frac{\sum_{i=1}^{N} \alpha_i \times B_i}{\sum_{i=1}^{N} \alpha_i}$$

[Equation 4]

In this case, if the value of αi=1 is set for each i, simple arithmetic averages of the evaluation values Ri, Gi and Bi for each region i will be adopted as the evaluation values <R>, <G> and <B> of the entire image. An example of setting the weight αi based on the luminance equivalent value for each region i is also described later referring to FIG. 10. In addition, a method of setting the weight αi is not limited to these examples, and the weight αi may be set by another appropriate method.

A white balance coefficient gr that is applied to the R component of a HDR combined image and a white balance coefficient gb that is applied to the B component of a HDR combined image that are global white balance coefficients to be applied to the entire image are calculated as shown in the following Equation 5 based on the evaluation values <R>, <G> and <B> for the entire image.

$$gr = \frac{\langle G \rangle}{\langle R \rangle} \quad gb = \frac{\langle G \rangle}{\langle B \rangle}$$

[Equation 5]

Next, the HDR combination section 33 combines the plurality of images of different exposure amounts to create a high dynamic range image which has a wider dynamic range than a single image (step S8). In this case, if there is a positional shift in the plurality of images, combination processing by the HDR combination section 33 is performed, for example, after aligning the images other than the image with the proper exposure, based on the proper exposure image.

Note that, hereinafter, processing by the HDR combination section 33 is described on the assumption that the processing is performed on RAW image data, and that the high dynamic range image that is created in also a RAW image. However, performance of the combination processing by the HDR combination section 33 with respect to image data on which image processing is performed by the image processing section 30 is not precluded.

Next, the basic image processing section 34 subjects the RAW image as the created high dynamic range image to image processing (so-called "development processing") to generate a YC image (luminance/color difference image) or an RGB image (step S9).

Thereafter, the image compressing section 37 performs JPEG compression with respect to the image that underwent development processing, and the microcomputer 50 records the resulting compressed image as a JPEG file on the recording medium 44 through the memory I/F 43 (step S10). The operation then returns from this processing to an unshown main processing.

Figure 4:
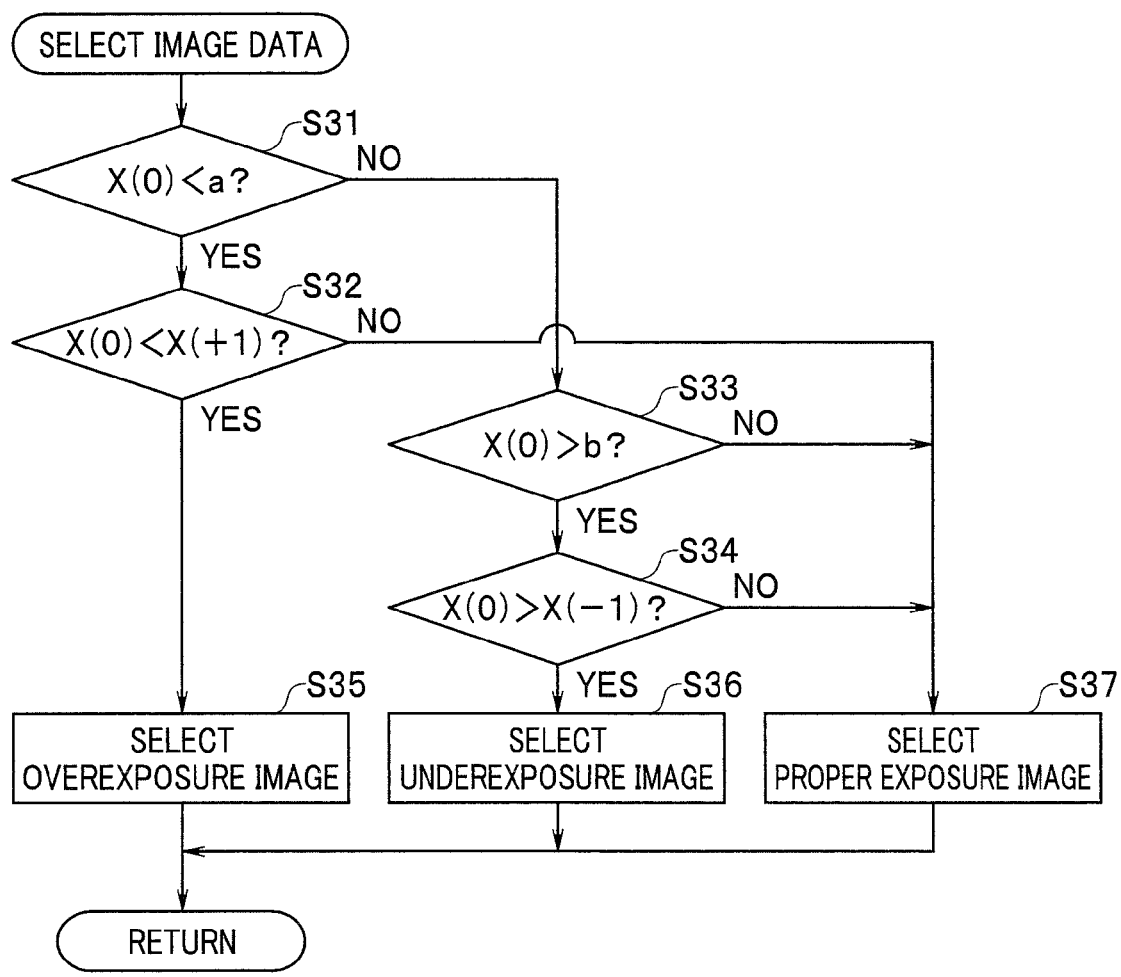
FIG. 4 is a flowchart illustrating details of image data selection processing in step S25 of FIG. 3 in a HDR combination mode according to the first embodiment.

FIG. 4 is a flowchart illustrating details of the image data selection processing in step S25 in FIG. 3 in the HDR combination mode. As described above, this image data selection processing is performed for each region i.

First, with respect to a certain region i, the luminance equivalent value of a proper exposure image is denoted by X(0), the luminance equivalent value of an underexposure image is denoted by X(−1), and the luminance equivalent value of an overexposure image is denoted by X(+1), and two threshold values that the image data selecting section 31 sets when the number of images is three are denoted by a and b (where a<b).

In the above described example,
X(0)=Gei (e=0), or X(0)=Yei (e=0)
X(−1)=Gei (e=−1), or X(−1)=Yei (e=−1), and
X(+1)=Gei (e=+1), or X(+1)=Yei (e=+1).

When the processing illustrated in FIG. 4 starts, first, the image data selecting section 31 determines whether or not X(0)<a (step S31).

In this case, if it is determined that X(0)<a, the image data selecting section 31 further determines whether or not X(0)<X(+1) in order to detect a positional shift of two or more pieces of image data among the plurality of pieces of image data of different exposure amounts (step S32). In general, when there is no positional shift, the luminance equivalent value is a value in accordance with the exposure amount. However, when there is a positional shift, in some cases an inverted relation arises between the luminance equivalent value and the exposure amount. Therefore, the present step S32 and a step S34 that is described later represent processing for determining whether or not there is a positional shift, by determining whether or not such an inversion occurs.

If it is determined in step S31 that X(0) a, the image data selecting section 31 determines whether or not X(0)>b (step S33).

If is determined that X(0)>b in step S33, in order to detect a positional shift of two or more pieces of image data among the plurality of pieces of image data of different exposure amounts, the image data selecting section 31 determines whether or not X(0)>X(−1) (step S34).

In step S32, if it is determined that X(0)<X(+1), the image data selecting section 31 selects the overexposure image (step S35). The selection in this case means that weights we (e=−1, 0, +1) are set as we (e=−1)=0, we (e=0)=0, and we (e=+1)=1.

Further, in step S34, if it is determined that X(0)>X(−1), the image data selecting section 31 selects the underexposure image (step S36). The selection in this case means that weights we (e=−1, 0, +1) are set as we (e=−1)=1, we (e=0)=0, and we (e=+1)=0.

In other cases, that is, in a case where it is determined in step S32 that X(0)≥X(+1) and there is a positional shift, if it is determined in step S33 that X(0)≤b, or if it is determined in step S34 that X(0)≤X(−1) and there is a positional shift, the image data selecting section 31 selects the proper exposure image (step S37). The selection in this case means that weights we (e=−1, 0, +1) are set as we (e=−1)=0, we (e=0)=1, and we (e=+1)=0.

Upon the weights we of the image e being set in any one of steps S35 to S37, the operation returns from the present processing.

Thus, in a case where the luminance equivalent value X(0) of the proper exposure image is a value such that a≤X(0)≤b, the image data selecting section 31 selects the proper exposure image, in a case where the luminance equivalent value X(0) is less than the threshold value a, the image data selecting section 31 basically selects the overexposure image, and in a case where the luminance equivalent value X(0) is greater than the threshold value b, the image data selecting section 31 basically selects the underexposure image. The reason that basic selections are described here is to indicate a case where a positional shift of two or more pieces of image data among a plurality of pieces of image data of different exposure amounts is not considered, that is, a case where the processing in step S32 and step S34 is not performed.

In contrast, in a case where a positional shift is considered, the image data selecting section 31 detects a positional shift of image data other than the image data for a proper exposure, relative to the proper exposure image data that serves as a standard for alignment, and if there is a positional shift, the image data selecting section 31 selects the proper exposure image instead of selecting the overexposure image or underexposure image in which appropriate information is not obtained.

Figure 5:
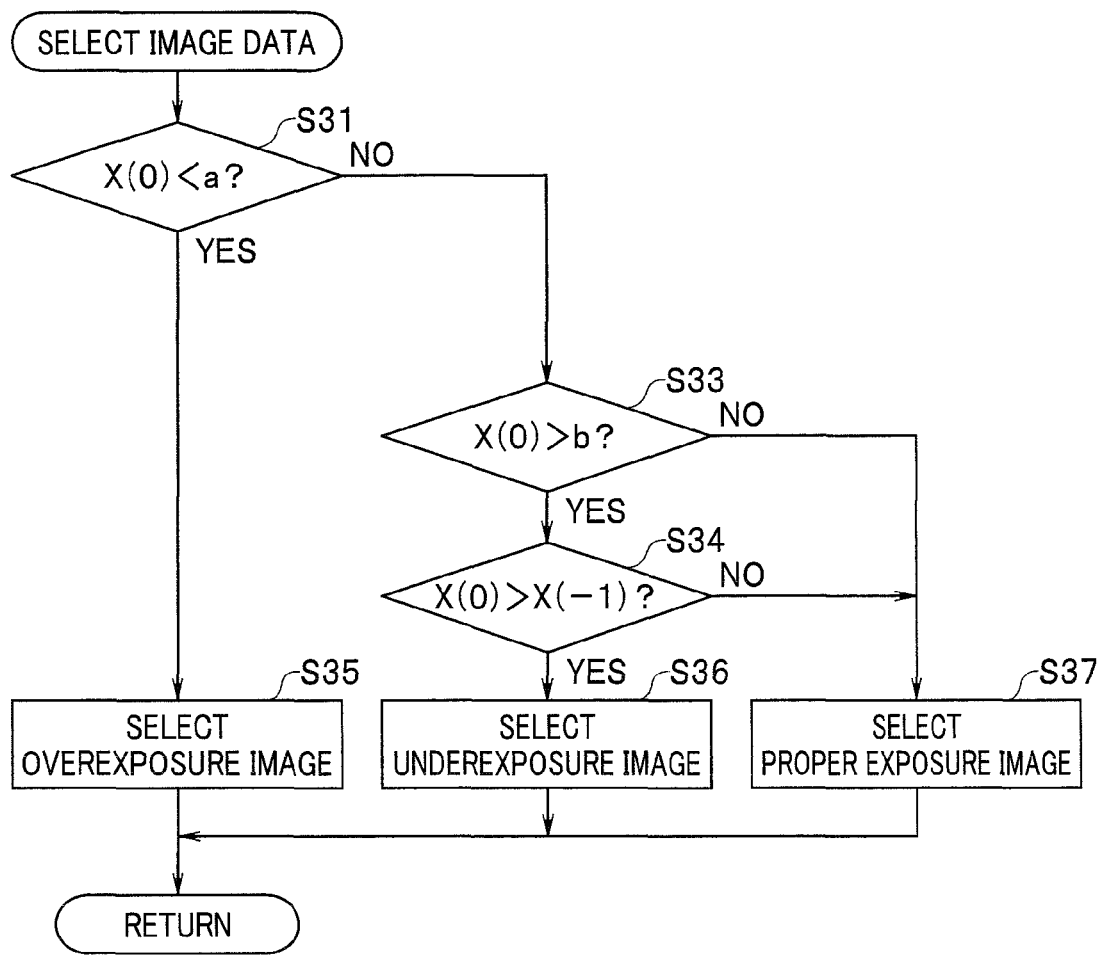
FIG. 5 is a flowchart illustrating details of image data selection processing in step S25 of FIG. 3 in a HDR combination underwater photographing mode according to the first embodiment.

FIG. 5 is a flowchart illustrating details of image data selection processing in step S25 in FIG. 3 when in the HDR combination underwater photographing mode. As described above, this image data selection processing is performed for each region i.

The processing illustrated in FIG. 5 is the same as the processing illustrated in FIG. 4, except that step S32 is omitted from FIG. 5. Accordingly, when it is determined in step S31 that X(0)<a, the image data selecting section 31 proceeds to step S35 to select the overexposure image.

Accordingly, when X(0)<a, the overexposure image is selected regardless of the magnitude relation between X(0) and X(+1), and the proper exposure image will not be selected.

Thus, in the case of underwater photographing in which there is a large degree of attenuation of an R component, the overexposure image in which the R component remains to a comparative degree in the image is selected with priority.

Note that, in FIG. 4 and FIG. 5, although whether or not a positional shift occurs is determined according to whether or not the magnitude relation with respect to the luminance equivalent value is inverted relative to the magnitude relation with respect to the exposure amount, the present invention is not limited thereto, and for example a configuration may be adopted so as to determine the occurrence of a positional shift based on color.

That is, because only the exposure amounts of the acquired plurality of images differ in a case where there is no positional shift, a difference in color between the plurality of images with respect to the region i is small (on the other hand, if there is a large difference in color, it can be estimated that there is a positional shift in an image). Therefore, a positional shift may be determined based on a color value. As the color value in this case, for example, it is sufficient to utilize a color-difference signal value C obtained when RGB color signal values are converted to a luminance/color difference signal value YC.

Specifically, the image data selecting section 31 calculates a color value for each region i in the respective images e based on image information for each region i (regional average values Rei, Gei and Bei of color components). With regard to a certain region i, a color value of a proper exposure image (e=0) that is calculated in this manner is denoted by C(0), a color value of an underexposure image (e=−1) is denoted by C(−1), a color value of an overexposure image (e=+1) is denoted by C(+1), and a color difference threshold value for determining whether or not a difference value of color values is large is denoted by Cth.

In this case, instead of the processing in step S32 in FIG. 4, it is sufficient to perform the following determination:

$$|C(+1)-C(0)|<Cth$$

Accordingly, if this conditional expression is satisfied, the operation proceeds to step S35 to select the overexposure image, while if this conditional expression is not satisfied (that is, if it is detected that there is a positional shift), the image data selecting section 31 proceeds to step S37 to select the proper exposure image.

Likewise, instead of the processing in step S34 in FIG. 4 and FIG. 5, it is sufficient to perform the following determination:

$$|C(-1)-C(0)|<Cth$$

If this conditional expression is satisfied, the operation proceeds to step S36 to select the underexposure image, while if this conditional expression is not satisfied (that is, if it is detected that there is a positional shift), the image data selecting section 31 proceeds to step S37 to select the proper exposure image.

Figure 6:
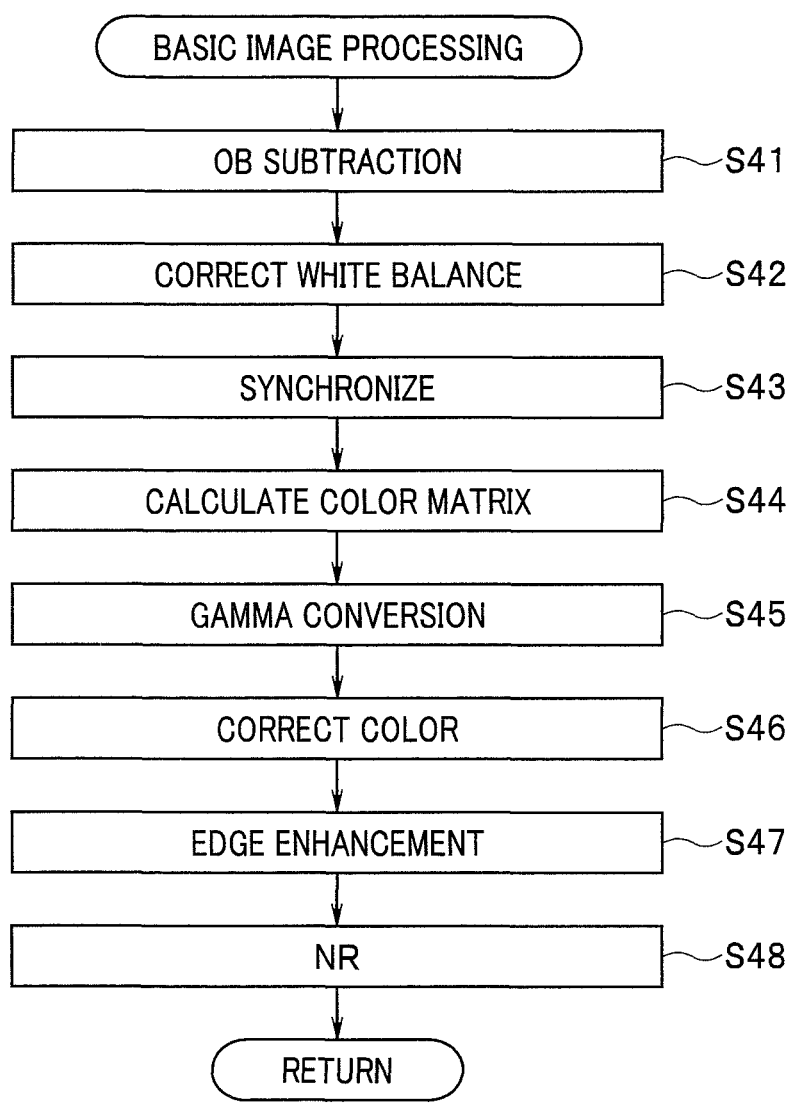
FIG. 6 is a flowchart illustrating details of basic image processing in step S9 of FIG. 2 according to the first embodiment.

FIG. 6 is a flowchart illustrating details of basic image processing in step S9 in FIG. 2.

When this processing starts, in order to reduce dark-time noise, OB subtraction processing is performed that subtracts pixel values of an optical black region of the image pickup device 22 from pixel values of an available pixel region of the image pickup device 22 (step S41).

Next, white balance correction is performed with respect to the image data of the Bayer array by multiplying pixel values of R pixels by an R gain calculated in step S7, and multiplying pixel values of B pixels by a B gain calculated in step S7 (step S42). That is, the basic image processing section 34 functions as a white balance correction section, and corrects the white balance of the combined image data using white balance coefficients calculated as described above by the white balance gain calculating section 32.

Subsequently, as synchronization processing, demosaicing processing is performed that converts from image data of an RGB Bayer array in which only one color component among the RGB components is present per pixel to image data in which all pixels include all of the three color components of R, G and B by determining color components that are not present on the pixel of interest by interpolation based on peripheral pixels (step S43).

In addition, a color matrix calculation is performed that reads out a color matrix coefficient corresponding to the set white balance mode (for example, a sunlight mode, a bulb mode or a fluorescent lamp mode) from the flash memory 48 of the camera main body 2, and multiplies the image data by the color matrix coefficient (step S44).

Next, a previously set gamma table is read out from the flash memory 48 of the camera main body 2, and the image data is subjected to gamma conversion (step S45).

Thereafter, color signals RGB are converted to luminance/color difference signals YCbCr, and color reproduction processing that corrects the chroma and hue so as to become a natural color reproduction is then performed as color correction processing (step S46).

Next, edge enhancement processing is performed by extracting edge components by using a band-pass filter on the image data, amplifying the extracted edge components by multiplying by a coefficient corresponding to a degree of edge enhancement, and adding the amplified edge components to the image data (step S47).

In addition, noise reduction processing is performed with respect to the image data by using a filter that reduces a high frequency, by performing coring processing that corresponds to a spatial frequency or the like (step S48). Note that, the noise reduction processing may be performed before the synchronization processing in step S43.

After the processing in step S48 is performed in this way, the operation returns from the present processing.

Figure 7:
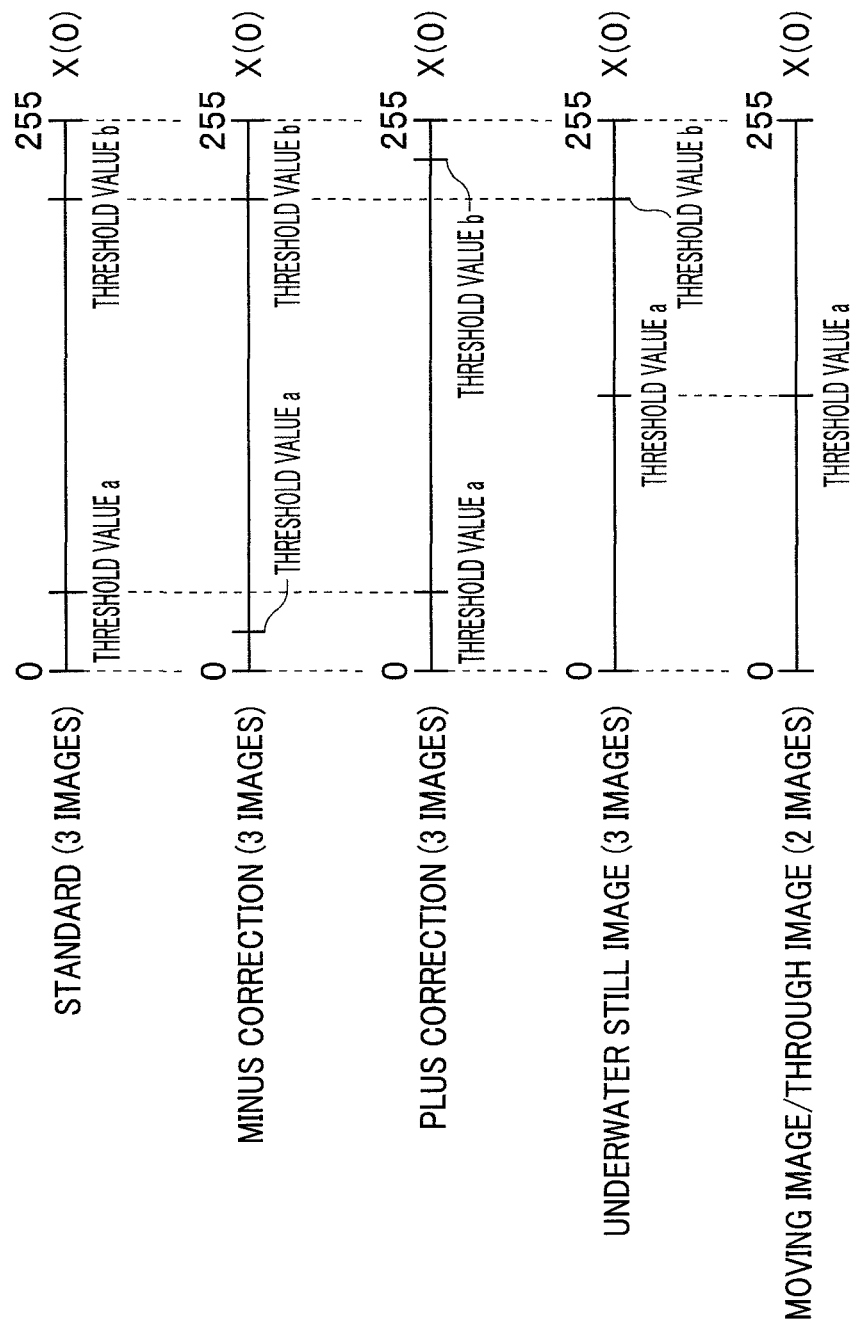
FIG. 7 is a view illustrating an example of setting a threshold value for comparison with a luminance equivalent value of a proper exposure image in accordance with a condition at a time of photographing according to the first embodiment.

FIG. 7 is a view that illustrates an example of setting a threshold value for comparing with a luminance equivalent value of a proper exposure image, according to a condition at the time of photographing. In FIG. 7, a case is illustrated in which the luminance dynamic range is 0 to 255.

In the uppermost section in FIG. 7, an example of the threshold values a and b in a case where the number of photographed images is three and which is a case of photographing a proper exposure image without particularly performing exposure correction or the like is illustrated. This example is referred to hereinafter as "standard settings example".

In the second section from the top in FIG. 7, an example of the threshold values a and b in a case where the number of photographed images is three and which is a case of performing exposure correction to a minus side and photographing a proper exposure image is illustrated. In this case, although the threshold value b is the same as in the standard settings example, the threshold value a is set to a lower value than in the standard settings example. That is, in a case where the user intentionally performs exposure correction to correct the exposure condition of a proper exposure image to the minus side, the threshold value a that is the lower of the threshold values is set to a lower value so as to increase a rate at which a proper exposure image is selected even in a dark region (so that an overexposure image is selected at a lower rate).

In the third section from the top in FIG. 7, an example of the threshold values a and b in a case where the number of photographed images is three and which is a case of performing exposure correction to a plus side and photographing a proper exposure image is illustrated. In this case, although the threshold value a is the same as in the standard settings example, the threshold value b is set to a higher value than in the standard settings example. That is, in a case where the user intentionally performs exposure correction to correct the exposure condition of a proper exposure image to the plus side, the threshold value b that is the higher of the threshold values is set to a higher value so as to increase a rate at which a proper exposure image is selected even in a bright region (so that underexposure image data is selected at a lower rate).

In the fourth section from the top in FIG. 7, an example of the threshold values a and b in a case where the number of photographed images is three and which is a case of underwater still image photographing is illustrated. In this case, although the threshold value b is the same as in the standard settings example, the threshold value a is set to a higher value than in the standard settings example. In the case of underwater photographing, an R component in an image noticeably decreases. Therefore, the threshold value a that is the lower of the threshold values is set to a higher value so that an overexposure image in which an R component is retained to a large extent is selected at a higher rate than in a case which is not underwater photographing (so that the rate of transitioning from step S31 to step S35 in FIG. 5 increases).

In the fifth section from the top in FIG. 7, an example of the threshold value a in a case where the number of photographed images is two (a proper exposure image is not photographed, and only an underexposure image and an overexposure image are photographed) (accordingly, the number of threshold values is 2−1=1), and which is a case of HDR combination processing of a moving image, a through image or the like is illustrated. The threshold value a in this case is set, for example, so as to be a value that is approximately an intermediate value between the two threshold values a and b in the standard settings example. Note that, although in the example in FIG. 7 this threshold value a is illustrated as a value that is equal to the threshold value a in the fourth section (for an underwater still image), the present invention is not limited thereto.

Note that, in the examples illustrated in the above described FIGS. 4 and 5, a weight of 1 is assigned to any one image with respect to the region i, and a weight of 0 is assigned to the other images. However, the present invention is not limited thereto, and a weight that is not zero may also be assigned to a plurality of images.

Figure 8:
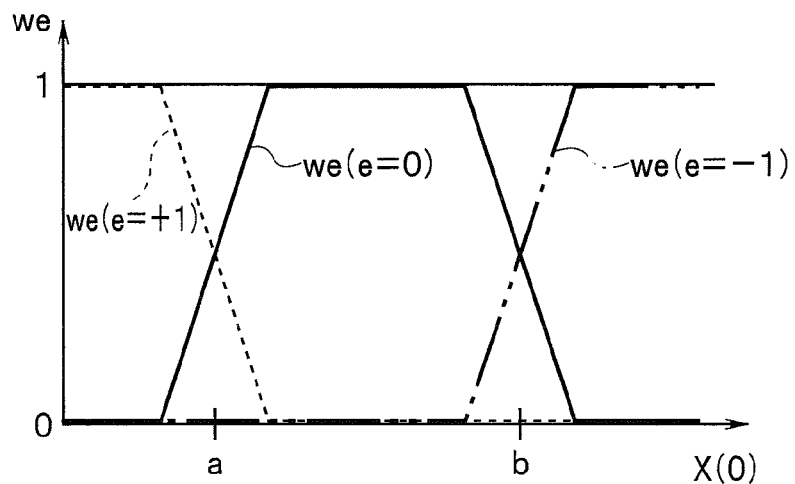
FIG. 8 is a diagram illustrating an example of performing weighted addition with respect to images of different exposure amounts in the vicinity of a threshold value in calculating evaluation values for each region when a number of photographed images is three according to the first embodiment.
Figure 9:
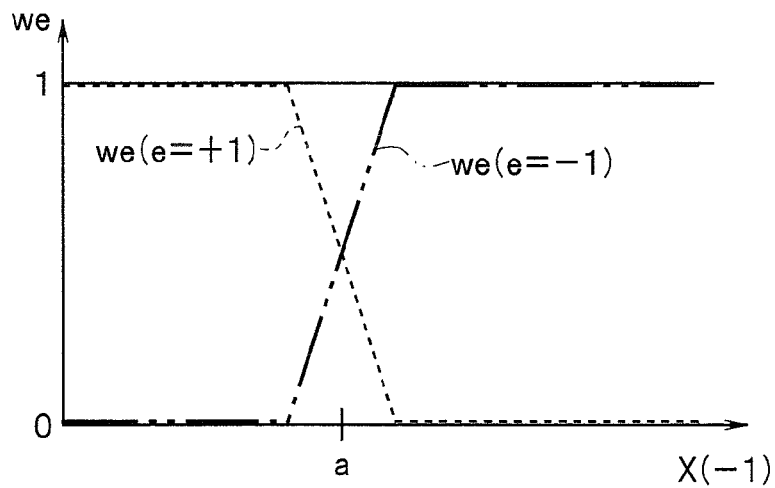
FIG. 9 is a diagram illustrating an example of performing weighted addition with respect to images of different exposure amounts in the vicinity of a threshold value in calculating evaluation values for each region when a number of photographed images is two according to the first embodiment.

In this regard, FIG. 8 and FIG. 9 illustrate examples in which weights are assigned to two images, in the vicinity of the threshold values. FIG. 8 is a diagram illustrating an example of performing weighted addition with respect to images of different exposure amounts in the vicinity of the threshold values a and b in calculating an evaluation value for each region i when the number of photographed images is three. FIG. 9 is a diagram illustrating an example of performing weighted addition with respect to images of different exposure amounts in the vicinity of the threshold value a in calculating an evaluation value for each region i when the number of photographed images is two.

As shown in FIG. 8 and FIG. 9, in a case where the luminance equivalent value X(0) of a proper exposure image is a value in the vicinity of the threshold value a or the threshold value b, a weight we that is not zero may be assigned to each of two images with respect to which selection is switched in a manner that sandwiches a threshold value therebetween in the processing in FIG. 4 or FIG. 5.

Specifically, in the example illustrated in FIG. 8, when the luminance equivalent value X(0) is in the vicinity of the threshold value a, the values for the weights we are:

we(e+1)≠0, we(e=0)≠0, we(e=−1)=0, while when the luminance equivalent value X(0) is in the vicinity of the threshold value b, the values for the weights we are:

we(e=+1)=0, we(e=0)≠0, we(e=−1)≠0.

Further, in the example illustrated in FIG. 9, when the luminance equivalent value X(0) is in the vicinity of the threshold value a, the values for the weights we are:

we(e=+1)≠0, we(e=−1)≠0.

In each of the cases illustrated in FIG. 8 and FIG. 9, while the weights we satisfy the normalization condition shown in Equation 2, the ratio between the weights that are not zero in the vicinity of the threshold values a and b changes in accordance with the luminance equivalent value X(0), and in areas other than the vicinity of the threshold values a and b the weights are the same as in the examples illustrated in FIGS. 4 and 5. Further, evaluation values Ri, Gi and Bi are calculated for each region i as shown in Equation 3 using these weights we.

Figure 10:
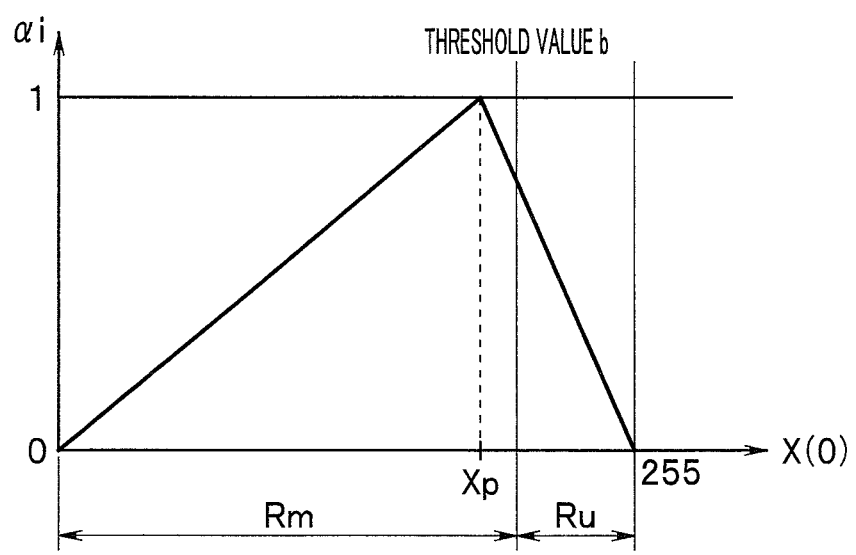
FIG. 10 is a diagram illustrating an example of changing a weight with respect to a region in accordance with a luminance equivalent value of a proper exposure image for the region, in calculating an evaluation value for an entire image according to the first embodiment.

FIG. 10 is a diagram illustrating an example of changing the weight αi with respect to the region i in accordance with the luminance equivalent value X(0) of a proper exposure image in the region i in calculating evaluation values for an entire image.

The weight αi that is used in calculating the evaluation values <R>, <G> and <B> for an entire image based on the evaluation values Ri, Gi and Bi for each region i is not limited to a value of 1 for obtaining a simple arithmetic average as described above, and may be varied for each region i.

FIG. 10 is an example of setting the weight αi based on the luminance equivalent value X(0) of a proper exposure image for each region i. Note that, in FIG. 10 also, an example is illustrated in which the luminance dynamic range is from 0 to 255.

Specifically, in the example illustrated in FIG. 10, the weight αi takes a value of αi=1 when the luminance equivalent value X(0) of the proper exposure image for the region i is, for example, a value Xp that is slightly less than the threshold value b, and when the luminance equivalent value X(0) becomes less than Xp, αi decreases such that X(0) is set to 0 and αi is set to 0, and even if the luminance equivalent value X(0) becomes greater than Xp, αi decreases such that X(0) is set to 255 and αi is set to 0. Note that, although an example in which increasing and decreasing is linear is illustrated in FIG. 10, the present invention is not limited thereto.

By performing the above described settings, the luminance equivalent value X(0) of the proper exposure image can be made larger than the threshold value b, and the weight αi in a region Ru that is the vicinity of a value at which pixel values saturate in a proper exposure image can be decreased. In addition, in a region Rm in which the luminance equivalent value X(0) of the proper exposure image is less than or equal to the threshold value b also, the luminance equivalent value X(0) is close to 0, and the weight αi can be gradually decreased in the vicinity of a value at which pixels in the proper exposure image become a black dead area.

By this means, with respect to the evaluation values <R>, <G> and <B> for the entire image, contributions in the vicinity of pixel saturation for which there is a possibility that the color balance will be lost and contributions in the vicinity of a black dead area at which the color balance becomes blurred can be appropriately suppressed, and calculation of white balance coefficients that place emphasis on a region of an intermediate brightness that is suitable for acquiring the color balance is enabled.

Furthermore, the present invention is not limited to the above described example, and a configuration may also be adopted in which the weight αi is increased when the region i is located at a central portion of the entire image, and the weight αi is decreased when the region i is located at a peripheral portion of the image. In this case, emphasis can be placed on the color balance of an object located at a central portion of a screen.

According to the above described first embodiment, the image data of two or more pieces of image data among a plurality of images of different exposure amounts are divided into a plurality of regions, one or more pieces of image data to be used in white balance adjustment are selected for each region i in accordance with a result of comparing a luminance equivalent value for each of the regions i obtained by dividing into the plurality of regions and a predetermined threshold value, and white balance coefficients are calculated for applying to combined image data using the selected image data, and thus white balance detection that is suited to a combined image can be performed at high speed and stably.

Further, because a configuration is adopted so as to set threshold values according to the conditions at a time of photographing, in a case where exposure correction is performed, a case where underwater photographing is performed, a case where moving image/through image photographing is performed, or the like, it is possible to select the image data to be used for white balance adjustment by means of threshold values that are suited to the respective cases.

Since a proper exposure image is selected in a case where the luminance equivalent value X(0) of the proper exposure image is within a proper range, an overexposure image is selected in a case where the luminance equivalent value X(0) is low, and an underexposure image is selected in a case where the luminance equivalent value X(0) is high, image data of a brightness that is suited to calculation of a white balance coefficient can be appropriately selected for each region i.

Further, in a case where there is a positional shift, because a configuration is adopted so as to select proper exposure image data that serves as a standard for alignment, the occurrence of a situation in which an overexposure image or an underexposure image in which appropriate information is not obtained due to a positional shift is selected can be suppressed.

At this time, in the case of detecting a positional shift based on a luminance equivalent value for each region i, because the luminance equivalent value is a value that is used for image data selection, processing to calculate another value or the like is not required.

On the other hand, in the case of detecting a positional shift based on a difference value between color values for each region i, selection of image data can be appropriately performed based on differences among colors.

In addition, since a configuration is adopted so as to calculate evaluation values using weights that satisfy a normalization condition, it is possible to combine a plurality of images at an appropriate ratio with respect to any region.

Further, in the case of underwater photographing, since a configuration is adopted to select image data so that an overexposure image is selected at a higher rate than in a case of photographing that is not underwater photographing, specifically, since threshold values are set so that an overexposure image is selected at a higher rate than in the case of photographing that is not underwater photographing, it is possible to appropriately calculate white balance coefficients based on an overexposure image in which a large amount of an R component is retained.

Furthermore, since threshold values are set so that an overexposure image is selected at a lower rate in a case where a minus exposure correction is performed with respect to a proper exposure image, and threshold values are set so that an underexposure image is selected at a lower rate in a case where a plus exposure correction is performed with respect to a proper exposure image, it is possible to perform white balance correction in which an object portion is emphasized in accordance with the intention of a photographer.

In addition, in the case of using a value of a color component (for example, a G component) that includes the largest amount of a luminance component as a luminance equivalent value, processing to calculate a luminance component Y based on RGB color components is omitted, and thus the processing load can be reduced.

Note that the respective sections explained above may be configured as circuits. Any circuit may be implemented as a single circuit or may be implemented as a combination of a plurality of circuits if the circuit can perform the same function. Further, any circuit is not limited to a circuit configured as a dedicated circuit for performing an intended function and may be a configuration that performs the intended function by causing a general-purpose circuit to execute a processing program.

Further, in the above explanation, the image processing apparatus is mainly explained. However, the present invention may be an image processing method for performing processing that is the same as the processing of the image processing apparatus or may be a processing program for causing a computer to perform processing that is the same as the processing of the image processing apparatus, a computer-readable non-transitory recording medium that records the processing program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus that combines a plurality of pieces of image data of different exposure amounts to generate combined image data, comprising:
    an image information calculation section configured to divide each of two or more pieces of image data among the plurality of pieces of image data of different exposure amounts into a plurality of regions, and calculate image information including a luminance equivalent value for each region into which the two or more pieces of image data are divided;
    an image data selecting section configured to select, for each of the regions, one or more pieces of image data for use in white balance adjustment from among the two or more pieces of image data, in accordance with a result of comparing the luminance equivalent value to a predetermined threshold value;
    a white balance gain calculating section configured to calculate a white balance coefficient that is applied to the combined image data, using image data that is selected for each of the regions by the image data selecting section; and
    a white balance correction section configured to correct a white balance of the combined image data using the white balance coefficient that is calculated by the white balance gain calculating section.

2. The image processing apparatus according to claim 1, wherein, when a number of the two or more pieces of image data is taken as "n" pieces, the image data selecting section is configured to set (n−1) of the threshold values, and the threshold values are set in accordance with a condition at a time of photographing.

3. The image processing apparatus according to claim 2, wherein:
    when the two or more pieces of image data are three pieces of data that are proper exposure image data, underexposure image data, and overexposure image data, and the luminance equivalent value in a certain region of the proper exposure image data is taken as $X(0)$,
    the image data selecting section is configured to set two of the threshold values as a value "a" and a value "b" that satisfies a relation a<b, and
    to select the overexposure image data in a case where $X(0)<a$,
    to select the proper exposure image data in a case where $a \leq X(0) \leq b$, and
    to select the underexposure image data in a case where $X(0)>b$.

4. The image processing apparatus according to claim 3, wherein the image data selecting section has a function that detects a positional shift of the two or more pieces of image data, and when a positional shift is detected, the image data selecting section:
    selects the proper exposure image data even if $X(0)<a$, and
    selects the proper exposure image data even if $X(0)>b$.

5. The image processing apparatus according to claim 4, wherein, when the luminance equivalent value in the certain region of the overexposure image data is taken as $X(+1)$, and the luminance equivalent value in the certain region of the underexposure image data is taken as $X(-1)$,
    at a time that $X(0)<a$ and $X(0) \geq X(+1)$, or a time that $X(0)>b$ and $X(0) \leq X(-1)$, the image data selecting section detects that there is a positional shift.

6. The image processing apparatus according to claim 4, wherein:
    the image data selecting section is configured to calculate a color value for each of the regions based on the image information for each of the regions,
    and when the color value in the certain region of the proper exposure image data is taken as $C(0)$, the color value in the certain region of the overexposure image data is taken as $C(+1)$, and the color value in the certain region of the underexposure image data is taken as $C(-1)$, using a color difference threshold value $Cth$ for determining whether or not a difference value between color values is large, the image data selecting section detects that there is a positional shift when $X(0)<a$ and $|C(+1)-C(0)| \geq Cth$, and when $X(0)>b$ and $|C(-1)-C(0)| \geq Cth$.

7. The image processing apparatus according to claim 1, wherein:
when the image data selecting section selects a plurality of pieces of image data for use in white balance adjustment with respect to a certain region, using weights satisfying a normalization condition such that a total of the weights is 1, the image data selecting section calculates an evaluation value based on image information of the certain region in the plurality of pieces of image data that are selected; and
the white balance gain calculating section is configured to calculate a white balance coefficient for applying to the combined image data based on an evaluation value calculated by the image data selecting section.

8. The image processing apparatus according to claim 1, wherein:
the two or more pieces of image data include overexposure image data, and
when a condition at a time of photographing is that underwater photographing is performed, the image data selecting section is configured to select image data so that the overexposure image data is selected at a higher rate than in a case where underwater photographing is not performed.

9. The image processing apparatus according to claim 2, wherein:
the two or more pieces of image data include overexposure image data, and
when a condition at a time of the photographing is that underwater photographing is performed, the image data selecting section is configured to set the threshold value so that the overexposure image data is selected at a higher rate than in a case where underwater photographing is not performed.

10. The image processing apparatus according to claim 3, wherein the image data selecting section has a function that detects a positional shift of the two or more pieces of image data, and when a condition at a time of the photographing is that underwater photographing is performed, while the image data selecting section detects a positional shift, the image data selecting section selects the proper exposure image data even if $X(0)>b$.

11. The image processing apparatus according to claim 2, wherein:
the two or more pieces of image data include proper exposure image data and overexposure image data, and
when performance of a minus exposure correction with respect to a proper exposure is a condition at a time of the photographing, the image data selecting section sets the threshold value so that the overexposure image data is selected at a lower rate.

12. The image processing apparatus according to claim 2, wherein:
the two or more pieces of image data include proper exposure image data and underexposure image data, and
when performance of a plus exposure correction with respect to a proper exposure is a condition at a time of the photographing, the image data selecting section sets the threshold value so that the underexposure image data is selected at a lower rate.

13. The image processing apparatus according to claim 1, wherein the luminance equivalent value is a value of a color component that includes a largest amount of a luminance component.

14. An image processing method for combining a plurality of pieces of image data of different exposure amounts to generate combined image data, comprising:
a first step of dividing each of two or more pieces of image data among the plurality of pieces of image data of different exposure amounts into a plurality of regions, and calculating image information including a luminance equivalent value for each region into which the two or more pieces of image data are divided;
a second step of selecting, for each of the regions, one or more pieces of image data for use in white balance adjustment from among the two or more pieces of image data, in accordance with a result of comparing the luminance equivalent value to a predetermined threshold value;
a third step of calculating a white balance coefficient that is applied to the combined image data, using image data that is selected for each of the regions by the second step; and
a fourth step of correcting a white balance of the combined image data using the white balance coefficient that is calculated by the third step.

* * * * *